United States Patent [19]
Prein et al.

[11] Patent Number: 4,651,324
[45] Date of Patent: Mar. 17, 1987

[54] METHOD AND APPARATUS FOR OPERATING A $CO_2$ GAS LASER

[76] Inventors: Franz Prein, Tulpenweg 3, D6901 Waldhilsbach; Heinrich Karning, Albert-Fritz-Str. 6, D 6900 Heidelberg, both of Fed. Rep. of Germany

[21] Appl. No.: 447,504

[22] Filed: Dec. 7, 1982

[30] Foreign Application Priority Data

Dec. 8, 1981 [DE] Fed. Rep. of Germany ....... 3148570
Oct. 30, 1982 [EP] European Pat. Off. ........ 82110042.7

[51] Int. Cl.⁴ .................................................. H01S 3/22
[52] U.S. Cl. ........................................ 372/59; 372/34; 372/60; 372/61; 372/83
[58] Field of Search ........................ 372/59, 60, 33, 34, 372/61, 83

[56] References Cited

U.S. PATENT DOCUMENTS

4,150,343  4/1979  Seelig et al. ........................... 372/60

FOREIGN PATENT DOCUMENTS

2038777  2/1972  Fed. Rep. of Germany .
1966271  5/1972  Fed. Rep. of Germany .
2028571  3/1980  United Kingdom ................... 372/59

OTHER PUBLICATIONS

Kakube et al., "Decomposition of $CO_2$ Molecules in a Sealed $CO_2$ Laser", *J. Appl. Phy.*, vol. 40, No. 9, 1969, pp. 3883-3884.

Witteman, "High-Output Powers and Long Lifetimes of Sealed-Off $CO_2$ Lasers", *APL*, vol. 11, No. 11, 1 Dec. 1967, pp. 337-338.

*Primary Examiner*—James W. Davie
*Attorney, Agent, or Firm*—Handal & Morofsky

[57] ABSTRACT

In electrically pumped $CO_2$ gas lasers, there take place widely different chemical and physical processes which lead, at least partially, to undesirable interactions of the gases among themselves, and/or of the gases with the electrical and/or the optical field and/or with the materials used in the gas-filled chambers. Bodies that are equipped with surface area-enlarging structures are included in the discharge or resonator chamber or in adjacent secondary chambers. The secondary chambers by themselves act as reservoirs or as carriers of reservoirs for suitable catalysts and gas components and/or the heating of the catalysts, and have a predetermined influence over the conditions of volume and/or pressure and/or temperature. The inclusion of such secondary chambers and such structures which enlarge surface area inside the chambers make possible the attainment of at least an approximate state of equilibrium, which leads to uniformly good discharge and long life with high laser efficiency.

14 Claims, 9 Drawing Figures

METHOD AND APPARATUS FOR OPERATING A $CO_2$ GAS LASER

TECHNICAL FIELD

The invention relates to a method for operating a $CO_2$ gas laser within a closed housing which is equipped with electronic means for causing an electrical discharge, a power supply, a discharge or resonator chamber and, if suitable, additional chambers that communicate with the discharge or resonator chamber. The invention further relates to an apparatus for carrying out the aforementioned method.

BACKGROUND OF THE INVENTION

A gas laser of this type if subject of, for example, W. Germany patent application P No. 31 23 049.0. Similar lasers are described in W. German patent application P No. 30 44 023.4-33 and in the European application No. 81 101440.6. In the typical gas discharges of electrically pumped $CO_2$ lasers of this kind, there occur several, partly independent chemical and physical processes that may lead to chages in the operation of the laser. Such effects may be caused, for example, by the absorption of ions, atoms or molecules at interior surfaces, by outgassing from surfaces and electrodes, by surface reactions, exchange reactions involving ions, atoms, molecules, and UV-photons, in the electrical discharge or else by diffusion processes across walls. Inasmuch as very complex reactions of this kind take place during gas discharges in lasers of the type described above, for example, the achievement of a state of stable equilibrium is relatively difficult. Therefore, the reactions have heretofore been more or less uncontrolled.

SUMMARY OF THE INVENTION

Accordingly, it is an object of the present invention to provide a highly stable laser function, i.e., to achieve a state of equilibirum, ideally with respect to all interactions of the gases with the electrical and optical fields, materials of the gas volumes and chambers, as well as all interactions of the gases with one another. This object is attained, according to the invention, by using spaces which have the form of chambers or tubs or are embodied in the manner of channels of a waveguide laser; or by using materials with surface-enlarging structures which are disposed in the laser spaces to serve as storage reservoirs or as carriers of such storage reservoirs and/or as carriers of catalysts; or by using storage reservoirs and/or carriers for further laser gas components having solid, liquid, or gaseous consistency and/or for catalysts; or by adjusting the total pressure or the partial pressures of the individual laser gas components in the laser chambers with the aid of pressure vessels having a defined leakage rate and/or with the aid of changes in pressure and/or volume and/or with the aid of temperature changes; or, during each charging or discharging process of the electrical energy storage device, by heating the catalysts, for example, by using a portion of the charging energy or causing the heating to take place in conjunction with one or more of the above characteristics.

In this way, it is possible to give the laser, and especially its interior, an uncontaminated operational state which facilitates electrical discharge even at extreme temperatures (especially low temperatures) under special requirements of power, energy, efficiency, pulse shape and wavelength; when using gas mixtures having an unfavorable chemistry; at high pressure and rapid pulse rates; as well as when operating without additional preionization or without other additional steps, such as the admixture of specific gases. This method also achieves long laser life.

A further development of the invention provides that the materials having surface-enlarging structures are highly porous solids or materials with high specific surface areas with or without grooves, notches, grids, tubes or holes, the function of which can also be improved by changes in pressure and/or temperature.

In the aforementioned context, a number of especially favorable features are achieved. Such reservoirs or carriers or at least the surfaces thereof that are to be activated consist of ceramic, quartz, (quartz-) glass, metal, sintered materials, clay, porcelain, alumina or aluminum silicate of sufficiently large specific surface.

These reservoirs, carriers or their effective surfaces are equipped with, for example, diffused-in, chemically bound or burned-in catalysts or laser components or with such catalysts or laser components that have been applied by vapor deposition, flame spraying or plasma spraying or by providing further storage reservoirs. Further reservoirs or catalysts of noble metals (for example, palladium or platinum), metals (for example, titanium), metal oxides (for example $MnO_2$ and/or CuO), carbon hydroxides (for example, palladium hydroxide), carbonates (for example, silver carbonate), or combination of noble metals and metal oxides may be provided. At least a part of the activated surfaces may be provided with CO and another part with $O_2$, water (hydrogen), carbon monoxide, formaldehyde, alcohol, carbonyl, copper, nickel, platinum, titanium, palladium or a mixture of $MnO_2/CuO$ may be used as a catalyst.

Surfaces of Cu, Ni or Pt exhibit the advantage of permitting higher temperatures during the gas discharge. If it is desired to carry out or even only to accelerate reverse reactions (which usually have low rates), it is suitable to adjust the hydrogen to approximately 0.2 to 15% by volume by gas mixing or by storage in, for example, palladium or titanium, and to adjust the water vapor pressure to approximately 0.1 to 10 torr. Alternatively, one may add carbon monoxide from 1 to 20 vol. % and/or water vapor from approximately 0.1 to 10 vol. % and/or methane and/or ethane and/or higher hydrocarbon compounds together up to about 10 vol. % and/or carbonates and/or carbonyls and/or formaldehyde in polymerized form, e.g., embedded in ceramic.

Other meaningful measures, especially for restraining the generation of negative ions that are harmful to the discharge as well as for keeping the concentrations of $O_2$ and $O_3$ within acceptable bounds, consist of adding various desirable gases and adjusting the temperature, pressure or volume. The gases can be added by causing a predetermined rate of leakage of an additive gas from a small pressurized vessel into the laser volume, by adding gas via a valve or nozzle, or by supplying a porous solid body in the laser volume which is permeated with an additive gas. The changes in temperature, volume, and pressure are brought about with the aid of heating or cooling systems.

In view of the frequency of dissociation of $CO_2$, a further advantageous characteristic of the invention is the use of an element combining a catalyst and an absorber and consisting at least partially of metal, e.g., platinum or nickel, and ceramic, e.g., $TiO_2$/M-

$nO_2$—$CuO$. When needed, the element is operated at least for a short time at elevated temperature and, preferably, near the anode electrode of the electric discharge.

However, in some cases it may also be meaningful to store in the discharge or resonator chamber, and/or in the chamber connected thereto, laser gas or components, gaseous and/or chemically bound and/or physically bound gases, e.g., carbon dioxide, hydrogen, water, helium, and to supply these to the discharge or resonator chamber continuously or in bursts, through diffusion and/or pressure and/or temperature effects.

During operation as a laser or amplifier, there are generated products of dissociation and subsequently formed compounds such as CO, $H_2O$, $O_2$, $O_3$ or nitrogen oxides. According to a further characteristic of the invention, these products can be removed continuously or intermittently by means of catalysts/absorbers and/or filters and/or adsorbers and/or they may be bound chemically and/or physically, and, if needed, other gaseous components, e.g., carbon dioxide, may be admitted.

The apparatus according to the present invention is also distinguished by the appliction of material on the internal surfaces of the walls of one or both chambers wherever these surfaces are free of optically or electrically operative elements. This material has a structure such that its surface area is enlarged. In at least one of the chambers there may be provided the following elements: a catalyst, an absorber, an adsorber, a filter, and/or a membrane with or without a heating or cooling device. The apparatus is also provided with a dosageable gas supply in the form of a gas storage element connected to one of the chambers or else the secondary chamber itself is embodied as a gas reservoir.

Of some further significance is the fact that the heater or the catalyst itself can be embodied as a high-impedance resistor connected in parallel with the discharge path. In that case, catalysis is especially initiated only when a discharge actually causes dissocation.

Preferred embodiments of the invention will be explained in detail below with the aid of the drawings wherein corresponding elements retain the same reference characters in all of the figures.

DESCRIPTION OF THE PREFERRED EMBODIMENTS

Figure 1:
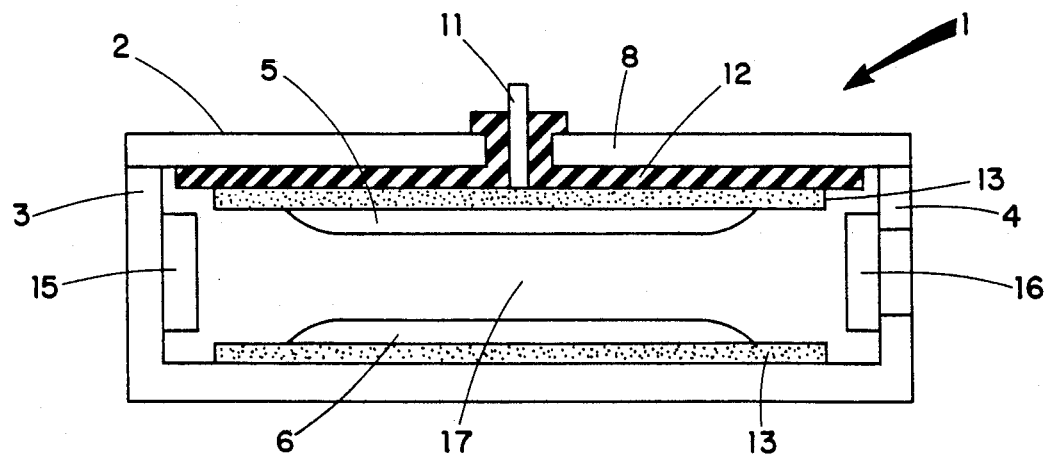
FIG. 1 is a longitudinal section through a transversely excited laser-amplifier with a gas reservoir or catalyst.

FIG. 1 is the principal schematic representation of an elongated excited laser-amplifier 1 which may be operated as a CW (continuous wve), RF (radio frequency), or pulsed laser and may be suitably adapted to such oepration. Its housing 2 consists of a symmetric hollow casing of metal, e.g., a nonmagnetic metal such as aluminum, copper, tungsten, or an alloy of these metals, or of a ferromagnetic metal. The housing is of substantially tub-like form with electrodes 5 and 6 disposed, respectively, at the internal surface at the bottom and the cover 8 of the housing, with the discharge surfaces of these electrodes confronting each other. The internal walls of the housing, the discharge surfaces of the electrodes, and other surfaces define the resonator chamber 17 (i.e., the volume where both resonation and gas discharge take place).

The width of the electrodes and their relative separation may be merely millimeters (when constructed as a waveguide) or may be centimeters, and their length can be as large as several tens of centimeters. The widths of the two electrodes can be equal or different; in the latter case, the widths of the electrodes 6 and 5 may be, for example, in the ratio 4:5 and they may be operated at voltages up to 30 kV. This results in field intensities of 10 to 25 kV/cm and energy densities of 0.1 to 0.5, (e.g., 0.25) joules per $cm^3$ of laser gas.

A voltage supply 11 delivers, for example, high potential to the electrodes 5 and 6 so that an electrical discharge may take place in the gas located between the discharge surfaces, thus stimulating the $N_2$ and/or $CO_2$ gas molecule. The voltage pulse required for this effect has a half-width of, typically, 100 nanoseconds and a leading edge ramp of less than 20 nanosecond duration. The resonator assembly 15 and 16, attached to the end faces 3 and 4 of housing 2, makes possible the extraction of electromagnetic energy from the housing 2. The electrode 5 and the voltage supply 11 are insulated electrically with respect to the remaining housing by the insulator 12. Between the insulator and the electrode 5, as well as between the electrode 6 and the bottom of the housing, materials 13 are disposed which have a surface area-enlarging structure and can serve as reservoirs or carriers of reservoirs and/or as carriers of catalysts for solid, liquid, or gaseous laser gas components and/or catalysts.

Figure 2:
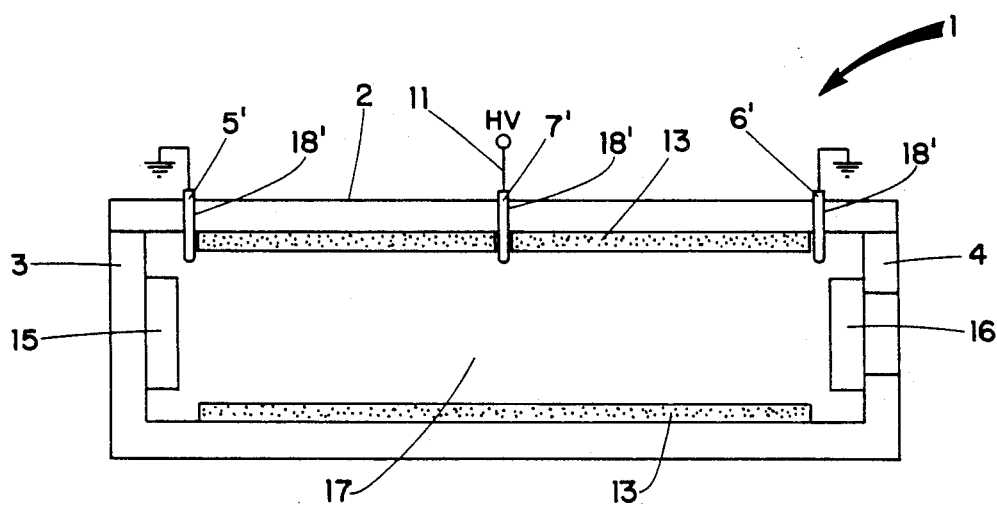
FIG. 2 is a laser-amplifier according to FIG. 1 but with an axially excited laser, which, if appropriately dimensioned, can also be constructed as a waveguide laser.

FIG. 2 illustrates an embodiment which differs from that of FIG. 1 in that the electrodes 5', 6' and 7' are disposed perpendicular to the longitudinal axis of the housing 2, which also represents the axis of beam extraction. These electrodes are attached in channels 18' which are cast in the housing 2 or drilled later, and serve to excite the laser in the longitudinal direction.

Figure 3:
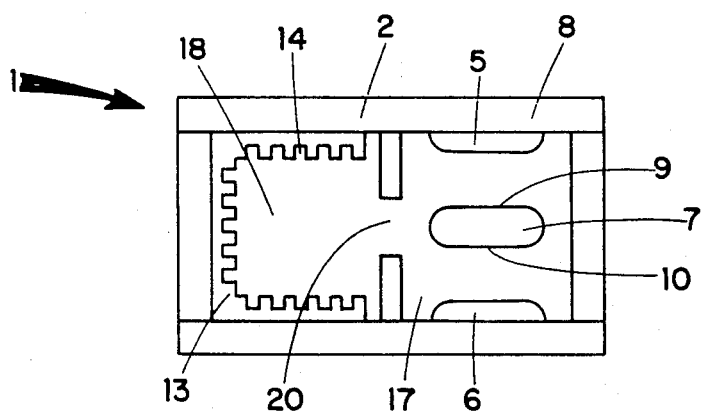
FIG. 3 is a cross-sectional view of the embodiment according to FIG. 1, including an additional (secondary) chamber with an internal wall covering.

FIG. 3 illustrates a cross-section laser amplifier 1 according to FIG. 1 with an additional central electrode 7 disposed along the longitudinal axis of the housing 2 and attached, for example, to the cover 8. The discharge surfaces 9 and 10 of the additional electrode 7 are disposed to confront the discharge surfaces of electrodes 5 and 6, respectively. This construction results in a once-folded beam path. Multiple beam path folding and correspondingly shorter construction would be conceivable in other embodiments not shown in the drawing. A secondary chamber 18 has internal walls that are covered with the surface area-enlarging material 13. The covering material 13 has grooves 14 that run parallel to the longitudinal axis and enlarge the total inside surface area. The secondary chamber 18 is disposed parallel to the resonator or discharge chamber 17 and may be cast in place or attached to the housing 2 later. Of course, other means by which the surface area can be enlarged, such as notches, grids, tubes, holes, and the like, are also conceivable and all of them would serve for improved gas preparation and regeneration. Possible materials 13 for this reservoir or carrier are ceramics, quartz, quartz glass, metal, sintered materials, clay, porcelain, aluminum oxide, or aluminum silicate having sufficiently large specific surfaces. Possible catalysts are water, hydrogen, carbon monoxide, formaldehyde, alcohol, carbonyl, copper, nickel, platinum, titanium, palladium, or a mixture of $MnO_2/CuO$. These catalysts or even laser components or further reservoirs made of nobel metals (e.g., titanium), or metal oxides (e.g., $MnO_2$ and /or CuO), or carbon, or hydroxides (e.g., palladium hydroxide), or carbonates (e.g., silver carbonate), or combination of noble metals and metal oxides and/or at least a part of the surfaces that are activated with CO and another part activated with $O_2$ can all be fixed in the volumes or on the surfaces of the reservoirs or carriers, for example, by diffusion, chemical bonding, or burning-in, or by vapor deposition, flame spraying, or plasma spraying, respectively. The opening 20 provides communication betwen the two chambers (the resonator or discharge chamber 17 and the secondary chamber 18).

Figure 4:
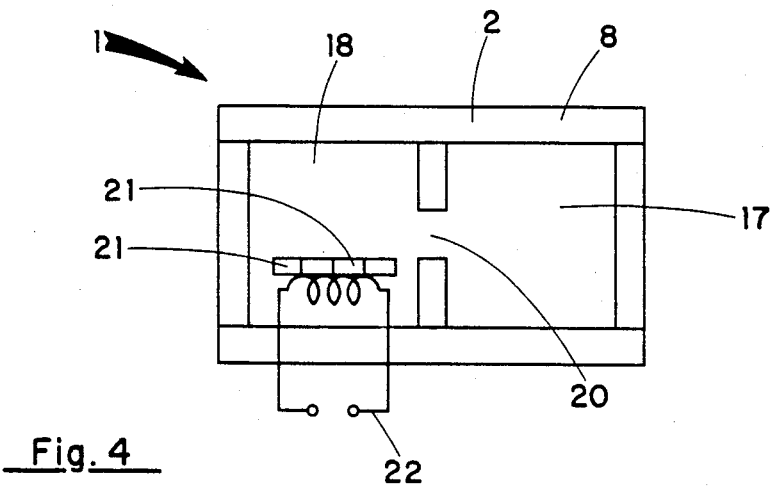
FIG. 4 is a cross-sectional view of the embodiment according to FIG. 3, including a combination of a catalyst/absorber and a heating or cooling device in the secondary chamber.

According to FIG. 4, different types of absorber 21, combined, if necessary, with a heating and/or cooling device 22, may be disposed in the chamber 18. With the aid of such heating or cooling devices, it is possible to cause short-term or long-term changes in the volume and/or temperature, changes of the total pressure in the system or also of partial pressures, e.g., that of hydrogen or carbon monoxide, independently of the discharge energy. The pressure, volume, and temperature conditions within the resonator or discharge chamber 17 can also be influenced by the deliberate addition of, e.g., carbon monoxide, water vapor, methane, ethane, higher hydrocarbon compounds, carbonates, carbonyls, or formaldehyde, individually or in combinations of more than one of these substances through the opening 20.

Figure 5:
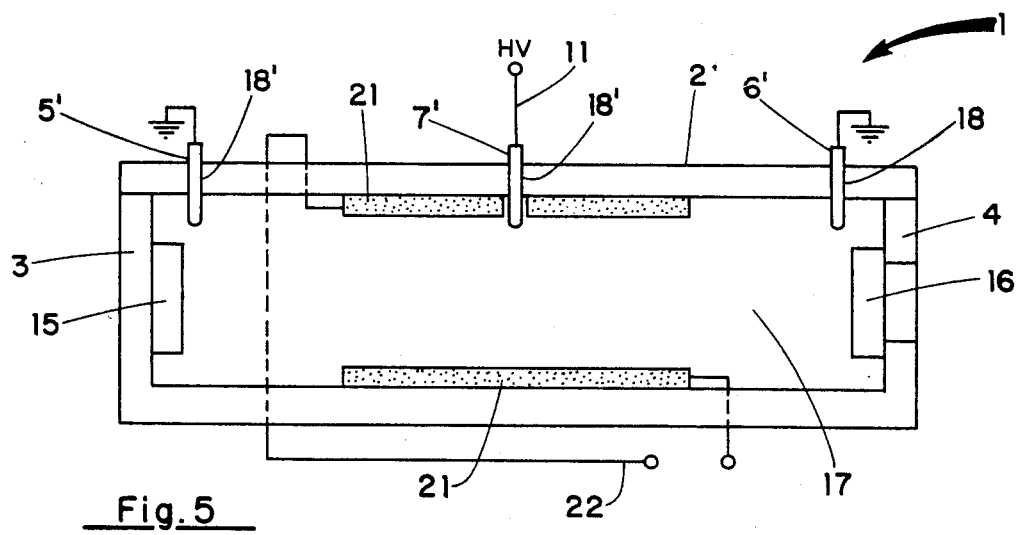
FIG. 5 is a longitudinal sectional view corresponding to that of FIG. 2, including a heatable and coolable absorber or catalyst.

FIG. 5 shows an element which is a combination of a catalyst and an absorber 21 in a longitudinally excited laser amplifier 1 and which is located near the anode 7' and its voltage supply 11.

Figure 6:
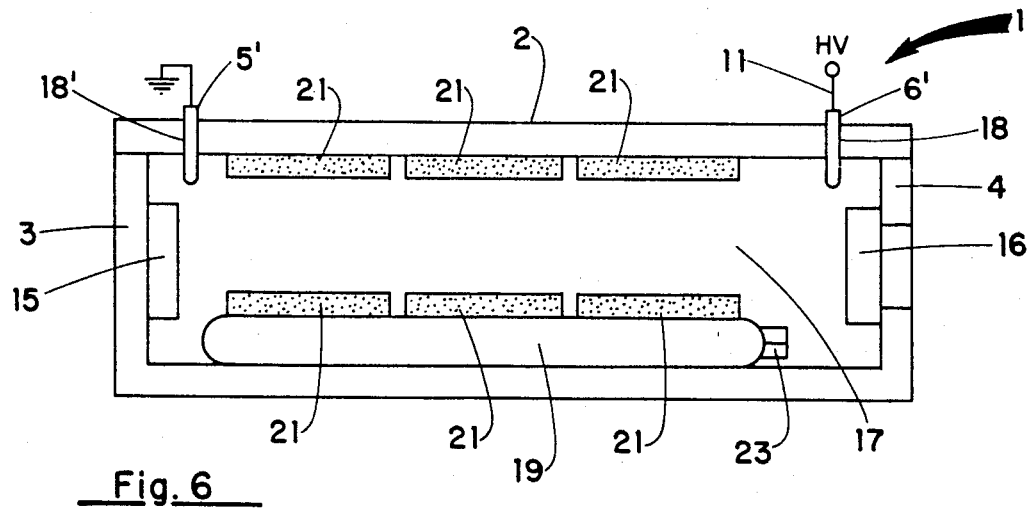
FIG. 6 is a longitudinal sectional view of the laser-amplifier according to FIG. 5, including absorbers, filters or diaphragms that are specific to the individual dissociation products.

However, the pressure, volume and temperature conditions and the removal of dissociation products can also be influenced by $CO_2$ (laser) gas or components, gaseous and/or chemically bound and/or physically bound gases, e.g., carbon dioxide, water, hydrogen, or helium that are stored in the reservoir 19 in the resonator or discharge chamber 17 (as in FIG. 6) or in a secondary chamber 18 connected to this chamber 17 (as in FIGS. 3 and 4). These materials can be supplied to the resonator or discharge chamber from the reservoir 19 through the nozzle 23, for example, under pressure and/or under the effect of temperature influences and/or by diffusion, either continuously or in bursts, and the dissociation products may be removed in a similar way. The absorbers 21, or adsorbers, filters, or diaphragms, are of highly specific nature relative to the various dissociation products.

Figure 7:
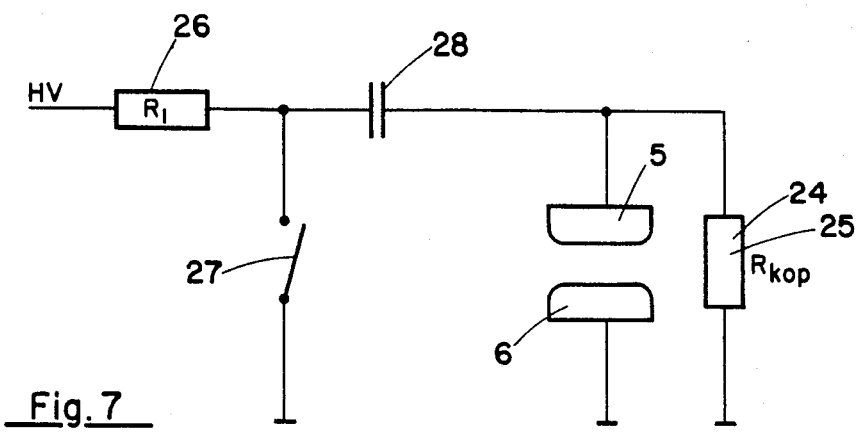
FIGS. 7-9 are circuit diagrams of the electrical integral heater and show the construction and disposition of a catalyst.
Figure 8:
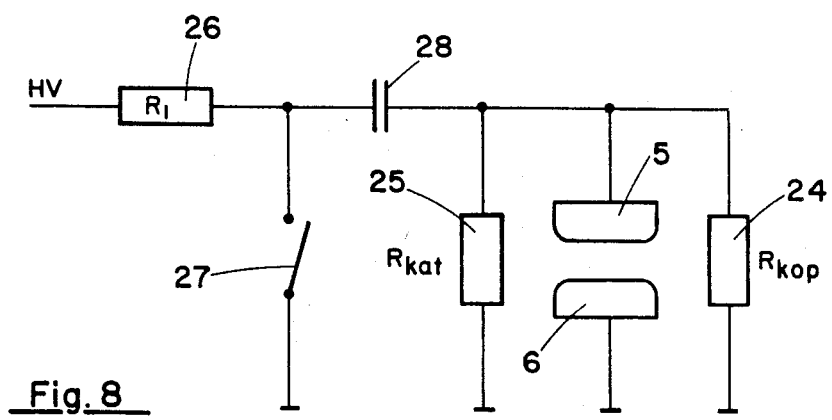
Figure 9:
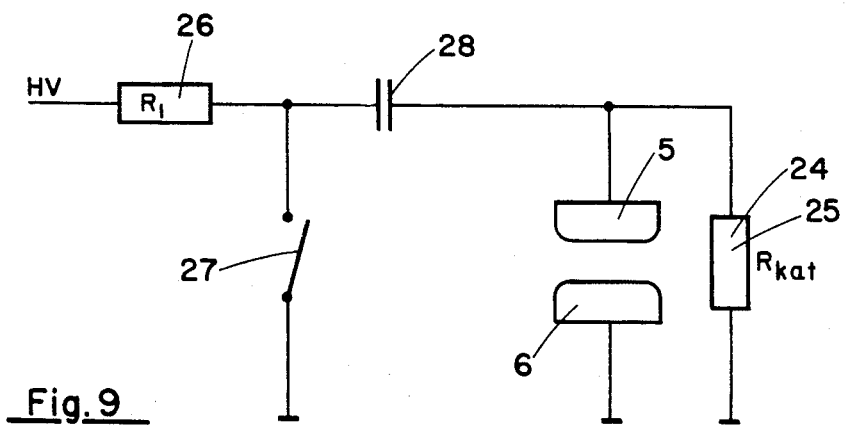

Finally, FIGS. 7 to 9 illustrate a possibility for causing a reverse reaction of CO and $O_2$, independently of, or in addition to, the gas chemistry described hereinabove. To this end, FIG. 7 shows a high-valued coupling resistor $R_{kop}$ in the form of a wire 24 which extends in parallel with the discharge path formed by the electrodes 5 and 6. In FIG. 7, the coupling resistor 24 is also the catalyst. In FIG. 8, this catalyst is provided, by way of example, in the form of a resistor $R_{kat}$ 25, also connected in parallel with the discharge path. In FIG. 9, in what may be termed an inversion of the scheme of FIG. 7, the catalyst itself is embodied as a coupling resistor. In all of the last three examples, a small portion of the charge energy is used to heat the catalyst during each discharge or charging process. the protective resistor $R_L$ 26 can be used in place of the catalyst 25, in a variant of the examples illustrated in FIG. 8 or 9. Also shown are a pulse switch 27 and a storage capacitor 28. The circuits shown are given only by way of example and, in principle, any circuit (Blumlein circuit and the like) that is customary for controlling lasers would be possible without thereby departing from the scope of the invention.

By way of example, there will now be given the various reactions of gases that are mixed together in the laser or are generated in the laser, such as He, $CO_2$, $N_2$, CO, $H_2O$, OH, $CH_4$, $O_2$, $O_3$, carbonyls, nitrogen oxides, etc. showing the dissociation reaction and the subsequent reactions of the $CO_2$ molecules.

$$CO_2 + e^- \rightarrow CO + O + e^-$$

$$CO + Ni \rightarrow Ni(CO)_4$$

$$CO + e^- \rightarrow C + O$$

$$O + e^- \rightarrow O^-$$

$$N_2 + 2O \rightarrow 2NO$$

$$H_2 + O \rightarrow H_2O$$

$$H_2O \rightarrow OH + H$$

$$C + 4H \rightarrow CH_4$$

These dissociations and subsequent reactions occur so frequently that they will determine the life of a sealed-off laser directly unless special steps are taken for reversing them. For example, $10^{16}$ $CO_2$ molecules can dissociate per second per $cm^3$ of volume. Similar reactions also take place for other molecules. The laser according to the invention was developed in order to prevent the reactions that lead to gas dissociation and demixing. This laser provides, within the laser chamber or chambers, for bodies having surface area-enlarging configurations and capable of serving as reservoirs or carriers of reservoirs of catalysts that make possible a state of equilibrium of the laser function.

If the $CO_2$ laser is used as an amplifier instead of as a generator, then the mirrors 15 and 16 must be replaced by end windows permitting the passage of radiation. In amplifier operation, immediately following the discharge between the electrodes, a pulse is fired through one of these windows into the medium in the amplifier; in general this pulse will have a better beam profile and lower power. The total pulse leaving the other window will then be amplified by approximately 3 to 10% per centimeter.

We claim:
1. A gas laser comprising:
   (a) a closed metal housing defining at least a first chamber with opposing endfaces substantially perpendicular to the longitudinal axis of said housing and containing a gaseous laser medium;
   (b) means for producing an electrical discharge in said gaseous medium in said first chamber;
   (c) a voltage supply connected to said means for producing a discharge;
   (d) means for producing resonation in said first chamber along said longitudinal axis;
   (e) insulation layer means for insulating said voltage supply from said housing and covering a first portion of the internal surface of said housing; and
   (f) a layer of material having a surface-enlarging structure, said layer of material covering a second portion of the internal surface of said housing and said insulating means, wherein said material is formed from materials in the group consisting of catalysts of reverse reactions, absorbents of specific substances, adsorbents of specific substances and suppliers of desired laser components.

2. A gas laser according to claim 1, wherein said layer of material comprises a surface enlarging structure selected from the group consisting of highly porous solids, materials with high specific surface, and materials having specifically configured surface irregularities.

3. A gas laser according to claim 2, wherein said layer of material has been made by having said catalyst and said desired laser components incorporated therein by a technique selected from the group consisting of diffusion, chemical bonding, burning in, vapor deposition, flame-spraying and plasma spraying on the surface of said layer.

4. A gas laser according to claim 3, further comprising a second chamber defined by said housing, said second chamber communicating with said first chamber in a manner that allows gas components to travel from one chamber to the other.

5. A gas laser according to claim 3, wherein said housing comprises a second chamber, one of said chambers having an element comprising a gas reservoir.

6. A gas laser according to claim 4, wherein either said first or said second chamber contains means for controlling the temperature in said chambers.

7. A gas laser according to claim 6, wherein said material is disposed in said second chamber in the form of an element attached to said means for temperature control.

8. A gas laser according to claim 6, wherein said means for temperature control operates by changing the temperature of said material.

9. A gas laser according to claim 4 wherein said surface enlarging layer of material comprises absorbing areas, each of said areas being specific to a particular product of gas dissociation.

10. A gas laser according to claim 5, wherein said element comprises a pressurized vessel connected to said first or second chamber via a port.

11. A gas laser according to claim 8, wherein said heater comprises a high-impedance resistor connected in parallel to the path of said gas discharge.

12. A gas laser according to claim 1, wherein said layer of material is selected from the group which consists of ceramic, quartz, quartz glass, metal, sintered material, clay, porcelain, aluminum oxide, and aluminum silicate.

13. A gas laser acording to claim 1, wherein said layer of material or said catalyst is formed from material selected from the group which consists of palladium, platinum, titanium, $MnO_2$, $CuO$, carbon, palladium hydroxide, and silver carbonate, and at least part of the activated surface is stabilized with CO and another part is stabilized with $O_2$.

14. A gas laser according to claim 1, wherein said catalyst is formed from material from the group which consists of water, carbon monoxide, formaldehyde, alcohol, carbonyl, copper, nickel, platinum, titanium, palladium, and a combination of $MnO_2/CuO$.

* * * * *